United States Patent [19]

Montgomery

[11] 4,192,418

[45] Mar. 11, 1980

[54] AUGER CONVEYER

[76] Inventor: Max L. Montgomery, Rte. 3, Kenton, Ohio 43326

[21] Appl. No.: 902,715

[22] Filed: May 4, 1978

[51] Int. Cl.² ............................................. B65G 33/26
[52] U.S. Cl. .................................. 198/659; 198/657; 198/661
[58] Field of Search ............... 198/659, 657, 661, 558, 198/548, 611

[56] References Cited

U.S. PATENT DOCUMENTS

| | | | |
|---|---|---|---|
| 2,507,245 | 5/1950 | Dady | 198/661 |
| 3,675,367 | 7/1970 | Amburn | 198/657 |
| 3,684,082 | 8/1972 | Wardell | 198/659 |

OTHER PUBLICATIONS

Xerox Disclosure Journal, vol. 2, No. 4, Jul./Aug. 1977, Tower Filter.

Primary Examiner—Robert B. Reeves
Assistant Examiner—Brian Bond
Attorney, Agent, or Firm—Gust, Irish, Jeffers & Hoffman

[57] ABSTRACT

An auger conveyer having an elongated auger shaft with closely spaced spirally wound bristles having their base ends affixed to the shaft and having the bristle tips extending outwardly from the shaft. A tubular housing extends from the input end of the spiral to the output end. The shaft is mounted for rotation about the shaft axis and when rotated conveys particles, such as grain, from the input end to the output end. The first several spiral flights of bristles at the input end are filled with a plastic material to solidify the bristles and form a substantially solid spiral to inhibit particle expulsion which otherwise would be caused by the bristles.

10 Claims, 3 Drawing Figures

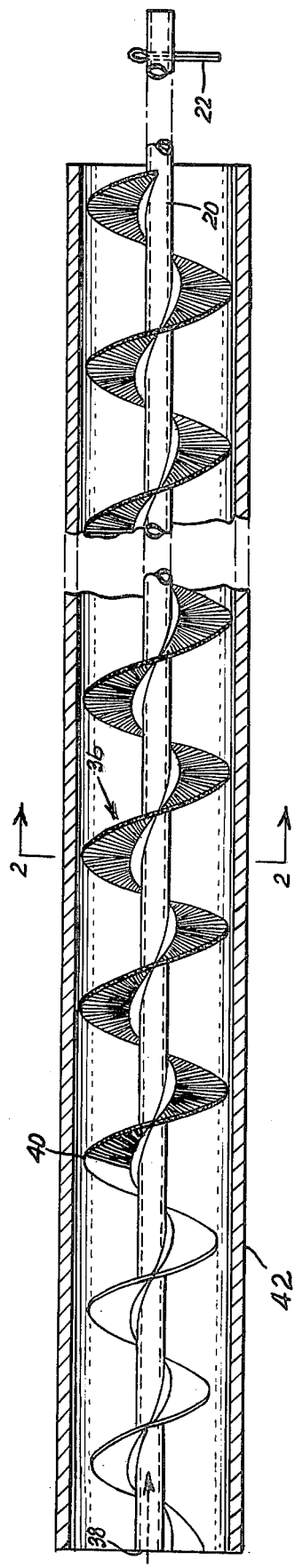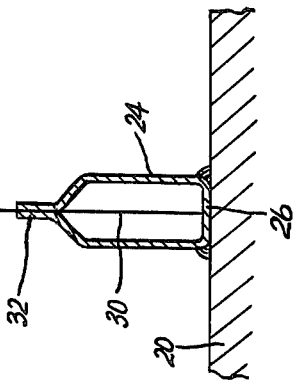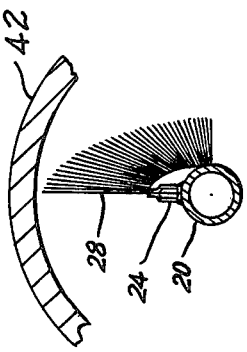

AUGER CONVEYER

BACKGROUND OF THE INVENTION

1. Field of the Invention

This invention is in the field of auger conveyers, and more particularly to those conveyers using closely spaced bristles to form the auger spiral.

2. Description of the Prior Art

Auger conveyers using bristles to form the spiral element on the auger are well known in the art for conveying grain such as corn, soybeans, wheat, oats, etc. The bristles tend to sweep the grain along the tubular conveyer housing thus minimizing cracking and injuring the grain material which metal spirals had previously caused. Also, the first several flights of bristles from the input end have a tapered increasing diameter. The prior art is exemplified by the devices disclosed in the U.S. Pat. Nos. 305,142; 307,275; 1,255,275; 1,255,276; 3,307,683; 3,684,082; and 3,802,551. However, it has been found that when using bristle augers, the grain has had a tendency to be thrown or expelled by the bristles from the input end of the conveyer causing loss of the conveyed granular particles and adding to air pollution in the vicinity of the conveyer input.

SUMMARY OF THE INVENTION

An auger conveyer has an auger shaft which is adapted to be mounted for rotation about the shaft axis. A plurality of spirally wound closely spaced bristles are affixed at their base ends to the shaft and have the bristle tips extending outwardly from the shaft. The bristles are affixed at their base ends by placement in a U-shaped metal channel, which is wound spirally about the auger shaft and has the base of the channel welded to the shaft. The walls of the channel are crimped to the base ends of the bristles to hold the bristles securely in place.

A tubular conveyer housing is supported in fixed relation to the shaft axis and is dimensioned to be closely spaced to the bristle tips so that upon rotation of the auger shaft, particulate matter, such as grain, placed at the input end of the spiral will be conveyed along the housing upon rotation of the auger shaft to the discharge end of the spiral. Typically, the input end of the spiral is in granular communication with an input hopper and the discharge end of the spiral is in granular communication with a discharge bin.

The first several spiral flights at the input end of the spiral, generally in an area of increasing taper, have the bristles imbedded in a plastic material to solidify the spiral flights, inhibiting granular expulsion by the bristles at the input end of the auger conveyer. Thus, an auger conveyer is provided which for the major length of the conveyer the auger spiral is formed of individual flexible bristles for conveying the granular material substantially without injury, and yet the granular expulsion at the input end of the auger spiral is inhibited.

Therefore, it is an object of this invention to provide an auger conveyer which minimizes injury and cracking of the conveyed granular material and inhibits granular expulsion at the input end of the conveyer.

Another object of this invention is to provide an auger conveyer having solidified auger spiral flights at the input end of the conveyer and having brush spiral flights for the remaining portion of the conveyer.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a side elevational view, partially sectioned and broken, of a preferred embodiment of this invention;

FIG. 2 is a section taken at 2—2 of FIG. 1; and

FIG. 3 is an enlarged view showing the manner of mounting the bristles to the auger shaft.

DESCRIPTION OF THE PREFERRED EMBODIMENT

Referring to the drawings, an auger shaft or arbor 20, which may be an approximately 1½ inch steel pipe, has a pinning hole formed through one end thereof to receive a drive motor pin 22. The arbor 20 length may be of any desired dimension to suit the application for which the conveyer is designed. A spiral metal U-shaped channel 24 has its base 26 affixed to arbor 20, as by welding, and has a pitch of 6½ inches between spirals in the embodiment shown. A heavy fill of bristles 28 have their base ends 30 inserted in the channel 24 and the channel walls are crimped at 32 to securely hold bristles 28 outwardly extending from arbor 20. In the embodiment shown, heavy fill bristles 38 are made of 0.060 inch Prostran which is a trade name of Whiting Co., 1 Howard St., Burlington, Vermont, for a polypropylene plastic material, and the spiral diameter, as measured between the tips 34 of oppositely extending bristles 28 from shaft 20 is 5⅝ inches. Other suitable bristle materials may be used.

The first 2½ flights of the spiral 36 formed by the bristles 28 from the input end 38 of the spiral 36, gradually increase from a 3⅝ inch outside diameter, as measured between the tips 34 of oppositely extending bristles 28, to the 5⅝ inch outside diameter previously described. Thus, the first 2½ flights, which includes that spiral portion to point 40 on spiral 36, are of gradually increasing outside diameter, and further, the bristles in those 2½ flights are encapsulated, or filled, with a plastic such as "R.T.V. 732", which is a silicon rubber available from Dow Corning, Midland, Michigan, or other suitable plastic which will solidify the bristles resulting in a substantially solid, stiffly resilient spirial. The plastic material is a heavy liquid putty-like material that is forced under pressure from a gun into a mold conforming to the bristle outer bristle configuration. The plastic material then cures at room temperature after which the mold is removed. Solidifying of the bristles in the first 2½ flights of increasing spiral diameter results in minimum of grain injury and expulsion from the input end 38 of the spiral 36 as the grain is being fed from an input hopper, not shown, and has an inside diameter which is closely spaced from the tips 34 and bristles 28 after the first 2½ flights, with the spacing between the interior conveyer tube diameter being correspondingly increased towards the input end for the first 2½ flights. The solidified nature of the bristles for the first 2½ flights inhibits expulsion of granular material from the input end of the tube. The number of spiral flights that are tapered and solidified with a solidifying material may be varied from that disclosed in the preferred embodiment and still achieve the advantages of this invention.

While there have been described above the principles of this invention in connection with specific apparatus, it is to be clearly understood that this description is made only by way of example and not as a limitation to the scope of the invention.

What is claimed is:

1. A spiral conveyer apparatus comprising:

an elongated arbor adapted to be mounted for rotation about the arbor longitudinal axis;

a spiral comprising a plurality of spirally wound closely spaced bristles affixed to and having bristle tips extending outwardly from said arbor and adapted to carry particles from the input spiral end to the discharge spiral end upon arbor rotation; and an elongated conveyer tube extending from the input end to the discharge end and having an interior surface spaced from the bristle tips for carrying particles from the input end to the discharge end as the arbor is rotated; said tube being substantially free of abrupt changes in diameter;

a portion of the spiral adjacent said input end being solid to thereby inhibit particle expulsion from said input end of said tube.

2. The apparatus of claim 1 wherein said portion comprises the bristles imbedded in a material to solidify said portion at the input end.

3. The apparatus of claim 2 wherein said portion comprises at least the first spiral flight at the input end of said spiral.

4. The apparatus of claim 2 wherein said portion comprises the first 2½ spiral flights from said input end.

5. The apparatus of claim 2 wherein said imbedding material is a silicon rubber.

6. The apparatus of claim 2 wherein a U-shaped metal channel is spirally wound on and affixed to said arbor;

the base ends of said bristles being positioned in said channel and extending outwardly from the arbor;

the walls of said channel being crimped to said base ends for securely retaining said bristles in said channel.

7. The apparatus of claim 1 wherein the radial spacing between said spirals and said tube gradually decreases for a predetermined longitudinal section of said tube, said section beginning at the input end.

8. The apparatus of claim 7 wherein said spiral diameter gradually increases from a first diameter at the input end of said section to a second diameter at the other end of said section, the remainder of said spiral having a diameter substantially equal to said second diameter.

9. The apparatus of claim 8 wherein said section length is approximately equal to said longitudinal dimension of said portion.

10. The apparatus of claim 1 wherein said tube is of substantially uniform internal diameter.

* * * * *